United States Patent [19]

Ishikawa et al.

[11] Patent Number: 5,684,568
[45] Date of Patent: Nov. 4, 1997

[54] IMAGE PRINTER

[75] Inventors: Masazumi Ishikawa; Toru Tanibata, both of Wakayama, Japan

[73] Assignee: Noritsu Koki Co., Ltd., Wakayama-Ken, Japan

[21] Appl. No.: 610,902

[22] Filed: Mar. 5, 1996

Related U.S. Application Data

[63] Continuation of Ser. No. 257,764, Jun. 9, 1994, abandoned.

[30] Foreign Application Priority Data

Jun. 14, 1993 [JP] Japan ................ 5-141625

[51] Int. Cl.$^6$ ................ G03B 27/00
[52] U.S. Cl. ................ 355/68; 355/35; 355/38; 355/71
[58] Field of Search ................ 355/35, 38, 68, 355/71

[56] References Cited

U.S. PATENT DOCUMENTS

| 4,935,772 | 6/1990 | Wahni et al. ................ 355/68 |
| 4,952,022 | 8/1990 | Genovese ................ 350/96.24 |
| 5,016,027 | 5/1991 | Vebbing ................ 346/107 |
| 5,063,405 | 11/1991 | Sakakibara ................ 355/1 |
| 5,337,117 | 8/1994 | Tanibata ................ 355/19 |

FOREIGN PATENT DOCUMENTS

| 227065 | 7/1987 | European Pat. Off. . |
| 424174 | 4/1991 | European Pat. Off. . |
| 514909 | 11/1992 | European Pat. Off. . |

*Primary Examiner*—Daniel P. Malley
*Attorney, Agent, or Firm*—Townsend and Townsend and Crew LLP

[57] ABSTRACT

An image printer includes a developing unit for developing a photosensitive material, a transport device for transporting the photosensitive material through an exposing position to the developing unit, an image exposure unit for exposing the photosensitive material with image information at the exposing position with dividing the image information into a plurality of lines extending perpendicular to a transporting direction of the photosensitive material. The printer further includes a measuring device for measuring intensity of light irradiated from a light irradiating end of the image exposure unit with respect to the photosensitive material and a correcting device for correcting the exposure amount based on measurement data of the measuring device.

5 Claims, 5 Drawing Sheets

IMAGE PRINTER

This is a continuation of application Ser. No. 08/257,764, filed Jun. 9, 1995, now abandoned.

BACKGROUND OF THE INVENTION

1. FIELD OF THE INVENTION

The present invention relates to an image printer, and more particularly to an image printer including transport means for transporting a photosensitive material through an exposing position to a developing unit and image exposure means for exposing the photosensitive material with image information at the exposing position with dividing the image information into a plurality of lines extending perpendicular to a transporting direction of the photosensitive material.

2. DESCRIPTION OF THE RELATED ART

According to an image printer of the above-described type, the image exposure means exposes the image information on to the photosensitive material which has been transported to the exposing position by the transport means. Then, the transport means further transports this exposed photosensitive material from the exposing position to the developing unit, by which the photosensitive material is developed.

When the image exposure means exposes the image information on to the photosensitive material, this exposure is effected with setting an exposure amount for each of the areas of the image information. Accordingly, for proper exposure of the photosensitive material, the set exposure amount and the actual exposure amount need to correspond to each other.

For this reason, according to the convention, an actual exposure amount is measured at the time of shipping of the image printer so as to cause the set exposure amount to correspond to the actual exposure amount of the photosensitive material.

However, even with the above adjustment at the time of shipping, the set exposure amount and the actual exposure amount of the photosensitive material become different from each other due to a secular or aging change in e.g. the irradiation light intensity of the exposure light source. In such case, the irradiation light intensity of the exposure light source is adjusted to equate with its initial value at the time of shipping.

Accordingly, although the actual exposure amount of the image exposure means is adjusted at the time of shipping of the printer, the convention only provides the adjustment of the irradiation light intensity of the exposure light source as means to cope with the problem of the aging change. Thus, the convention has been unable to fully cope with any other type of aging change such as in the light transmission characteristics of the optical components disposed in the light path extending to the light irradiating end of the image exposure means.

The present invention attends to the above-described state of the art. A primary object of this invention is to provide an image printer capable of properly correcting an aging change in an actual exposure amount.

SUMMARY OF THE INVENTION

For achieving the above-noted object, an image printer, according to the present invention, comprises:

- a developing unit for developing a photosensitive material;
- transport means for transporting the photosensitive material through an exposing position to the developing unit;
- image exposure means for exposing the photosensitive material with image information at the exposing position with dividing the image information into a plurality of lines extending perpendicular to a transporting direction of the photosensitive material;
- measuring means for measuring intensity of light irradiated from a light irradiating end of said image exposure means with respect to the photosensitive material; and
- correcting means for correcting said exposure amount based on measurement data of said measuring means.

According to the above-described construction, the image exposure means exposes the image information on to the photosensitive material which has been transported to the exposing position by the transport means. Then, the transport means further transports this exposed photosensitive material from the exposing position to the developing unit, by which the photosensitive material is developed.

The measuring means, depending on the necessity, measures intensity of light irradiated from the light irradiating end of the image exposure means to the photosensitive material. Then, based on this measurement data, the exposure amount for each area is corrected.

That is to say, the correction of the exposure amount is effected based on measurement of the intensity of the light from the light irradiating end to the photosensitive material.

Incidentally, the exposure amount of the photosensitive material may be roughly expressed as a product of an exposure time period and an exposing light intensity. And, the correction of an exposure amount as referred to herein means correction of the exposure time period or of the exposing light intensity for the light of each exposing color.

As described above, since the correction of the exposure amount is effected based on measurement of the intensity of the light from the light irradiating end to the photosensitive material, it is possible to correct the deviation of the actual exposure amount of the photosensitive material due to the aging change in a more proper manner than the conventional construction where only the light intensity of the exposure light source is adjusted.

According to a further aspect of the invention, the correcting means corrects the exposure amount through adjustment of an exposure time period.

With this, the correcting means effects the exposure amount correction through adjusting the exposure time period based on the measurement data of the measuring means.

More specifically, if the measurement result of the measuring means indicates reduction in the intensity of the light at the light irradiating end, the correction is effected so as to extend the exposure time period. On the other hand, if the measurement result indicates increase in the intensity of the light at the light irradiating end, the correction is effected so as to shorten the exposure time period.

As a result, since the exposure amount correction is done through the adjustment of the exposure time period, there is no particular necessity of providing any special mechanism for the purpose of exposure amount correction. Thus, the construction of the image printer may be simple.

According to a still further aspect of the present invention, the correcting means corrects the exposure amount through adjustment of light intensity.

With this construction, the correcting means effects the exposure amount correction through adjustment of the intensity of the light irradiated from the light irradiating end of the image exposure means based on the measurement data of the measuring means.

More specifically, if the measurement result of the measuring means indicates reduction in the intensity of the light at the light irradiating end, the correction is effected so as to increase the light intensity. On the other hand, if the measurement result indicates increase in the intensity of the light at the light irradiating end, the correction is effected so as to decrease the light intensity.

As a result, since the exposure amount correction is done through the adjustment of the intensity of the light irradiated from the light irradiating end, there is no necessity of additional special processing on the image information based on which the exposure amount is set. Hence, the setting operation of the exposure amount may be effected speedily, thereby to contribute to reduction of the exposure processing time period.

According to a still further aspect of the present invention, said measuring means effects the measurement of the light irradiated from the light irradiating end through measurement of one measurement unit of the light corresponding to one of the divided areas of the image information.

With the above-described construction, in measuring the intensity of the light irradiated from the light irradiating end, the measuring means effects this measurement through the measurement of one measurement unit of the light corresponding to one of the divided areas of the image information. Then, based on this measurement data, the correction of the exposure amount is effected.

That is to say, the measurement of the light intensity is effected with respect to the minimum unit based on which the exposure amount for exposing the photosensitive material is set.

As a result, through the measurement of the minimum unit used for setting of the exposure amount, the correction of the exposure amount may be effected accurately.

According to a still further aspect of the present invention, said measuring means includes a light sensor unit having a sensing area narrower than a width of the light irradiating end perpendicular to the transporting direction of the photosensitive material, the light intensity being measured by scanning said light sensor unit along the light irradiating end.

With this construction, in measuring the intensity of the light irradiated from the light irradiating end of the image exposure means, the measuring means effects this measurement through the scanning of the light sensor unit along the light irradiating end.

As a result, in comparison with a further conceivable construction where e.g. a plurality of light sensing units are disposed along the light irradiating end, the above arrangement can render the construction of the measuring means simple.

According to a still further aspect of the present invention, said correcting means effects the correction of the exposure amount for each predetermined time period.

With the above construction, the correcting means effects the exposure amount correction for each predetermined time period.

As a result, the image exposure means may continuously effect proper exposure.

According to a still further aspect of the present invention, said correcting means effects the exposure amount correction each time when an amount of the exposure operation has reached a predetermined value.

With this construction, the image exposure means may continuously effect proper exposure in a more reliable manner.

Further and other objects, features and effects of the invention will become apparent from the following more detailed description of the embodiments of the invention with reference to the accompanying drawings.

DESCRIPTION OF THE PREFERRED EMBODIMENTS

Next, preferred embodiments of an image printer relating to the present invention will be described in particular with reference to the accompanying drawings.

Figure 1:
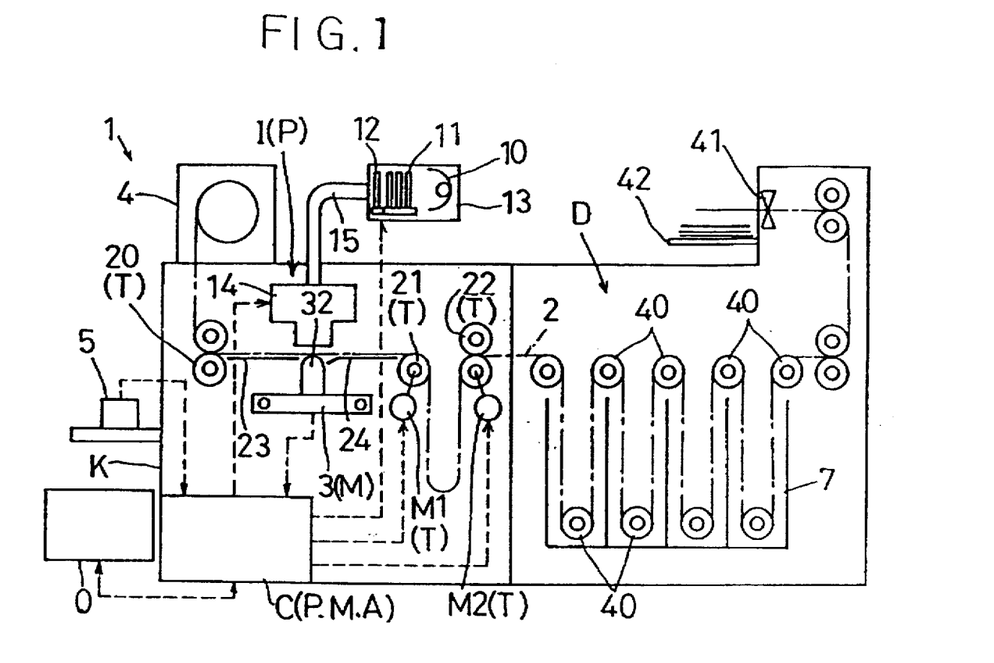
FIG. 1 is a schematic construction view of an image printer according to one preferred embodiment of the present invention.

As shown in FIG. 1, an image printer 1 generally includes transport means T having a construction to be described later for transporting a printing paper 2 as a photosensitive material, image exposure means P including a scanner 5, an image exposure unit I and a control unit C and adapted for exposing the printing paper 2, measuring means M including a measuring unit 3 and the control unit C and adapted for intensity of light irradiated from a PLZT printing head 14 corresponding to a light irradiating end of the image exposure means P, and a developing unit for developing the printing paper 2 which has been exposed at the image exposure means P. All these components are housed together inside a casing K, as shown in FIG. 2.

Figure 2:
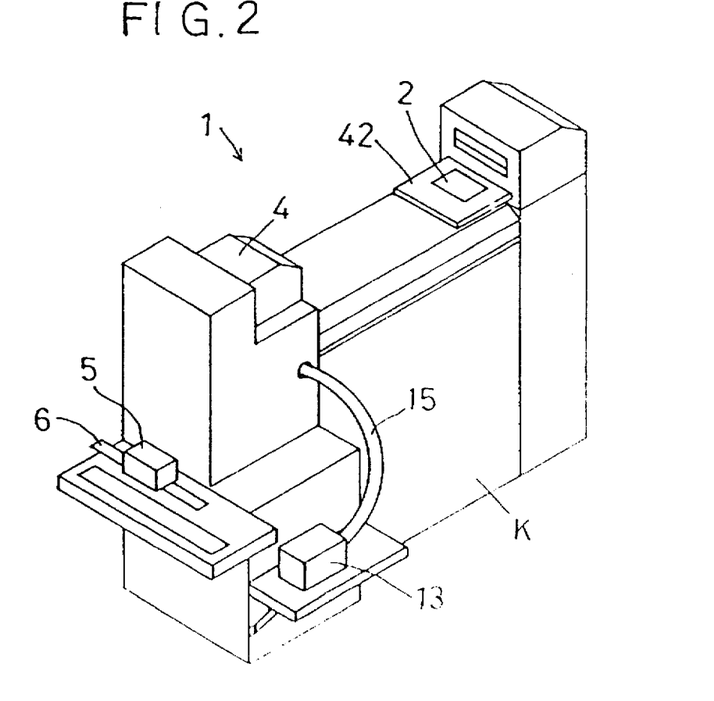
FIG. 2 is a perspective view showing an appearance of the image printer of FIG. 1.

As also shown in FIG. 2, the printing paper 2 is withdrawn by the transport means T from a printing-paper magazine 4 detachably attached to an upper position at a longitudinal end of the casing K. The withdrawn printing paper 2 is transported to an exposing position located in opposition to the PLZT printing head 14 to be exposed by the image exposure means P. This exposed printing paper 2 is further transported by the transport means T to the developing unit D to be subjected to a developing operation.

Incidentally, the control unit C not only functions as the image exposure means P and the measuring means M, but also executes overall control of the operations of this image printer 1.

Next, the respective components will be specifically described.

The transport means T includes rollers 20, 21, 22 and motors M1, M2. The rollers 20 and 21 are disposed respectively on the upstream and downstream sides of the transport passage of the printing paper 2 relative to the PLZT printing head 14. The roller 22 is disposed farther downstream of the transport passage of the printing paper 2 than the roller 21.

The rollers 20, 21 are connected to each other via an unillustrated belt to be driven together by the motor M1. The roller 22 is driven by the motor M2.

Between the upstream side in the transport passage of the printing paper 2 relative to the roller 21 arid the downstream side in the transport passage of the printing paper 2 relative to the roller 22, there exists a difference in the transporting speeds of the printing paper 2 resulting from a difference in the processing capabilities between the image exposure means P and the developing unit D. Thus, between these rollers 21, 22, the printing paper 2 is accumulated in the form of a loop thereby to absorb the difference of the transport speeds.

The scanner 5, though not shown, includes three CCD line sensors, with each CCD line sensor including color filters of the three primary colors, i.e. red, green and blue. Then, as shown in FIG. 2, the scanner is disposed on a shelf portion at the longitudinal end of the casing K.

The scanner 5 is operable to read the image information as divided into a number of areas with transmission light through a film 6 being resolved into the above-described three primary color components. Incidentally, because of the use of the CCD line sensors, the scanner, when remaining stationary, can read only one-line amount of the image information. Thus, in order to read the two-dimensional image information, the reading operation of the image information of the film 6 by the scanner 6 is effected while the film 6 is being transported by an unillustrated roller driven by an unillustrated motor. The image information read by the scanner 5 is transmitted to the control unit C.

The image exposure unit I of the image exposure means P includes a light source unit 13 housing, within a single casing, a light source 10, a color filter 11 for creating a predetermined exposure color from light irradiated from the light source 10, and a shutter 12; the PLZT printing head 14; and an optical fiber bundle 15 for guiding the light from the light source unit 13 to the PLZT printing head 14.

Figure 3:
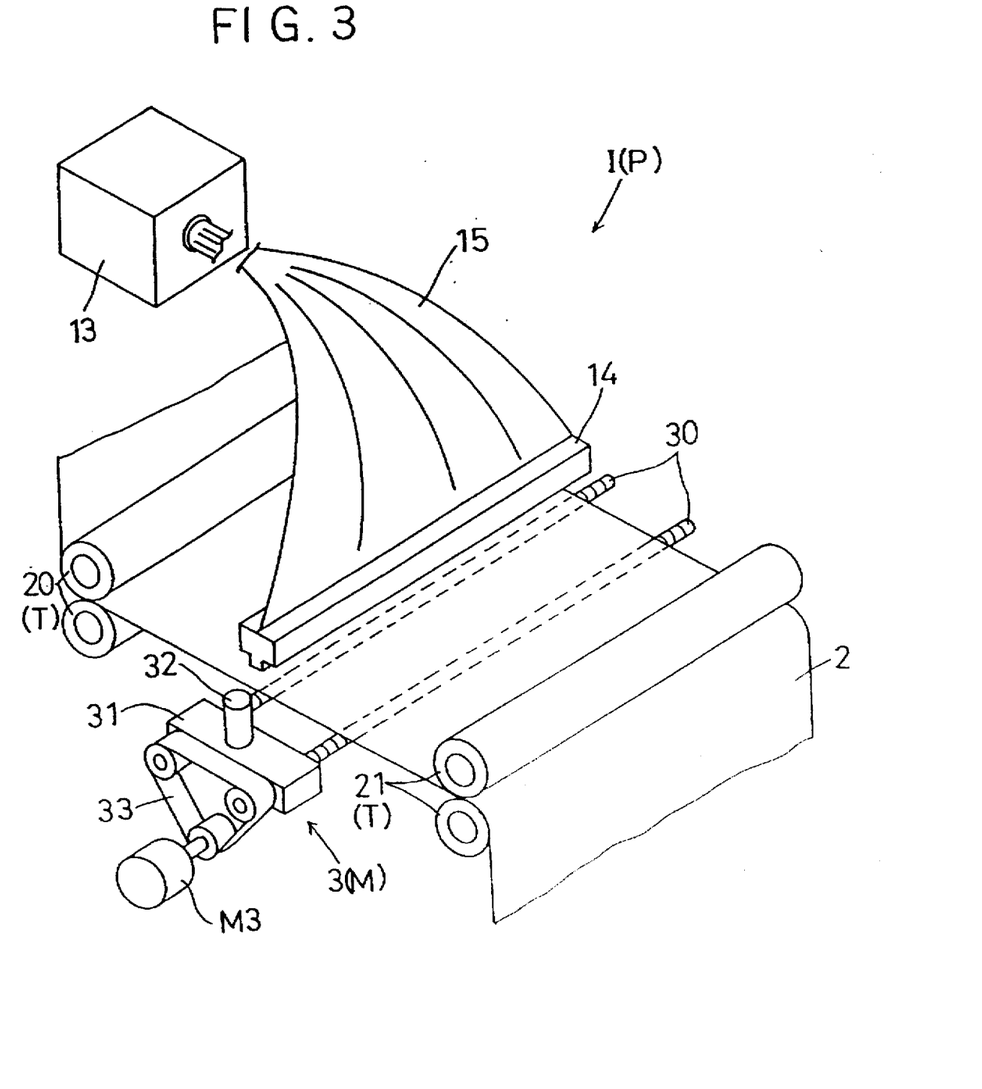
FIG. 3 is a perspective view showing major portions of the image printer of FIG. 1.

The PLZT printing head 14, as shown in FIG. 3, has a configuration extending in the direction perpendicular to the direction of the transport passage of the printing paper 2. The inner construction of this PLZT printing head, though not shown, comprises a number of assemblies each including PLZT interposed between a polarizer and an analyzer, with the assemblies being linearly disposed along the direction perpendicular to the direction of the transport passage of the printing paper 2. Then, by varying a voltage to be impressed between a pair of electrodes attached to each PLZT, the polarizing direction of the light transmitted between the electrodes is varied thereby to selectively allow or inhibit passage of the light through each PLZT. In this manner, the printing head acts as a light shutter.

For exposing the printing paper at the image exposure unit I, based on the image information read by the scanner 5, the control unit C controls a switch-over operation of the color filters 11 of the light source unit 13, thereby to switch over the color of the light irradiated from the light source unit 13 among the three colors of red, green and blue and controls also opening/closing of the light shutters of the PLZT printing head 14 for each color, thereby to expose the printing paper 2. Since the PLZT printing head 14 comprises the one-dimensional assembly of the light shutters, the printing head 14 can expose only one-line amount of image information at one time. Then, for exposing the two-dimensional image information, this is done while the printing paper 2 is being continuously transported by the transport means T.

Figure 4:
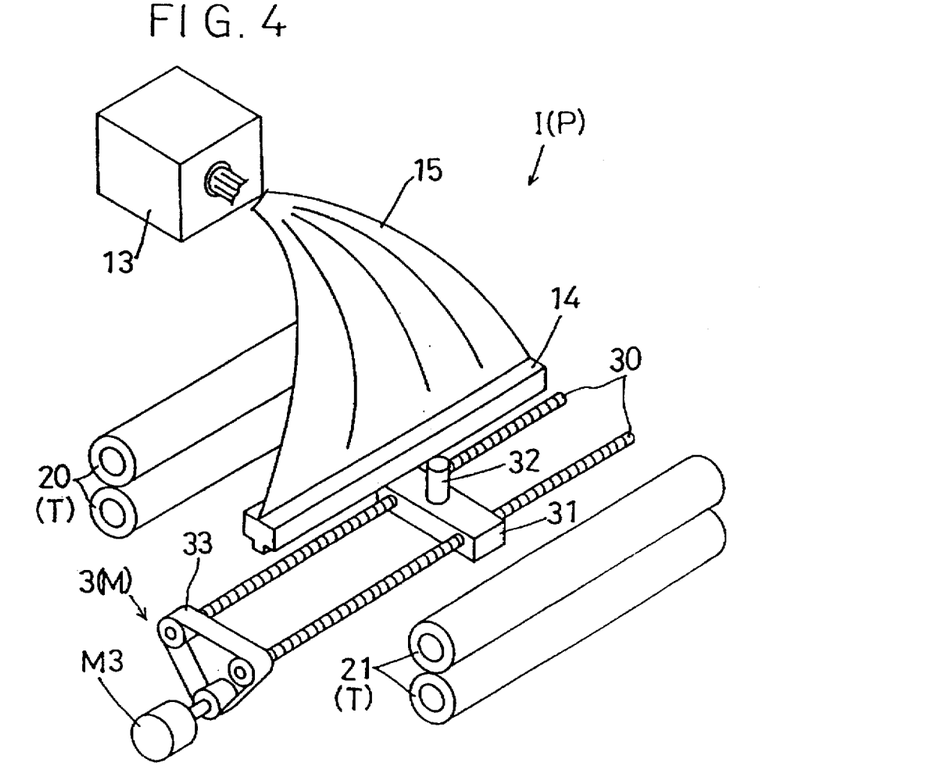
FIG. 4 is a perspective view showing further major portions of the image printer of FIG. 1.

The measuring unit 3 of the measuring means M, as shown in FIG. 4, includes a pair of ball-bearing screws 30 extending parallel to each other, a sensor mount 31 mounted on and between the pair of ball-bearing screws 30, a light sensor 32 acting as a light sensing unit and mounted at a center of an upper face of the sensor mount 31, and a motor M3 operatively connected via a belt 33 with respective terminal ends of the pair of ball-bearing screws 30 and acting as drive means for rotatably driving the ball-bearing screws 30.

Figure 5:
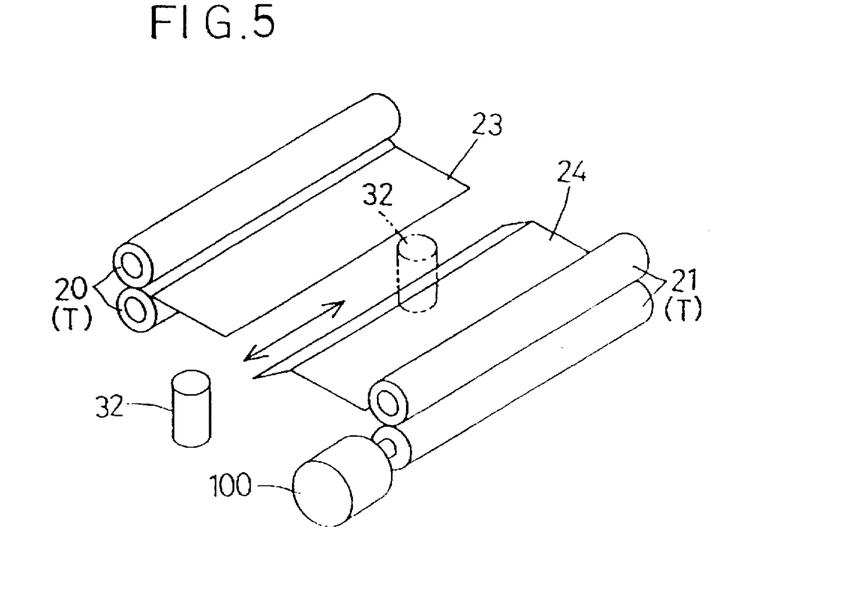
FIG. 5 is a perspective view showing still further major portions of the image printer of FIG. 1.

As shown in FIG. 3, the measuring unit 3 is disposed immediately below the PLZT printing head 14 across the transport passage of the printing paper 2. As shown in FIGS. 1 and 5, between the roller 20 and the roller 21, there are provided two printing-paper guides 23, 24 for guiding the printing paper 3 from the under side thereof. As illustrated in FIG. 5, the light sensor 32 is moved along a space between these two printing-paper guides 23, 24 in the direction perpendicular to the direction of the transport passage of the printing paper 2.

For the measuring means M to measure the intensity of the light irradiated from the PLZT printing head 14, the control unit C activates the motor M3 to rotatably drive the pair of ball-bearing screws 30 thereby to scan the light sensor 32 along the longitudinal direction of the PLZT printing head 14. Whereas, in association with this scanning movement of the light sensor 32, those of the light shutters of the PLZT printing head 14 which come into opposition to the light sensor 32 are opened one after another. Then, for each of these light shutters, the intensity of its irradiation light is measured, and this measurement result is transmitted to the control unit C.

The developing unit D includes four units of developing tanks 7, rollers 40 and a cutter 41 for cutting the developed printing paper 2 into pieces each corresponding to one-frame amount of image information. The rollers 40 are operatively connected with the rollers 22 via an unillustrated belt to be driven by the motor M2.

The printing paper 2 introduced into the developing unit D is transported by the rollers 40 and is developed through its successive passage through the developing tanks 7 filled with developing liquids. The printing paper 2, after being cut by the cutter 41, is discharged onto a receiver tray 42 disposed adjacent the upper face of the casing K, as shown in FIGS. 1 and 2.

Figure 6:
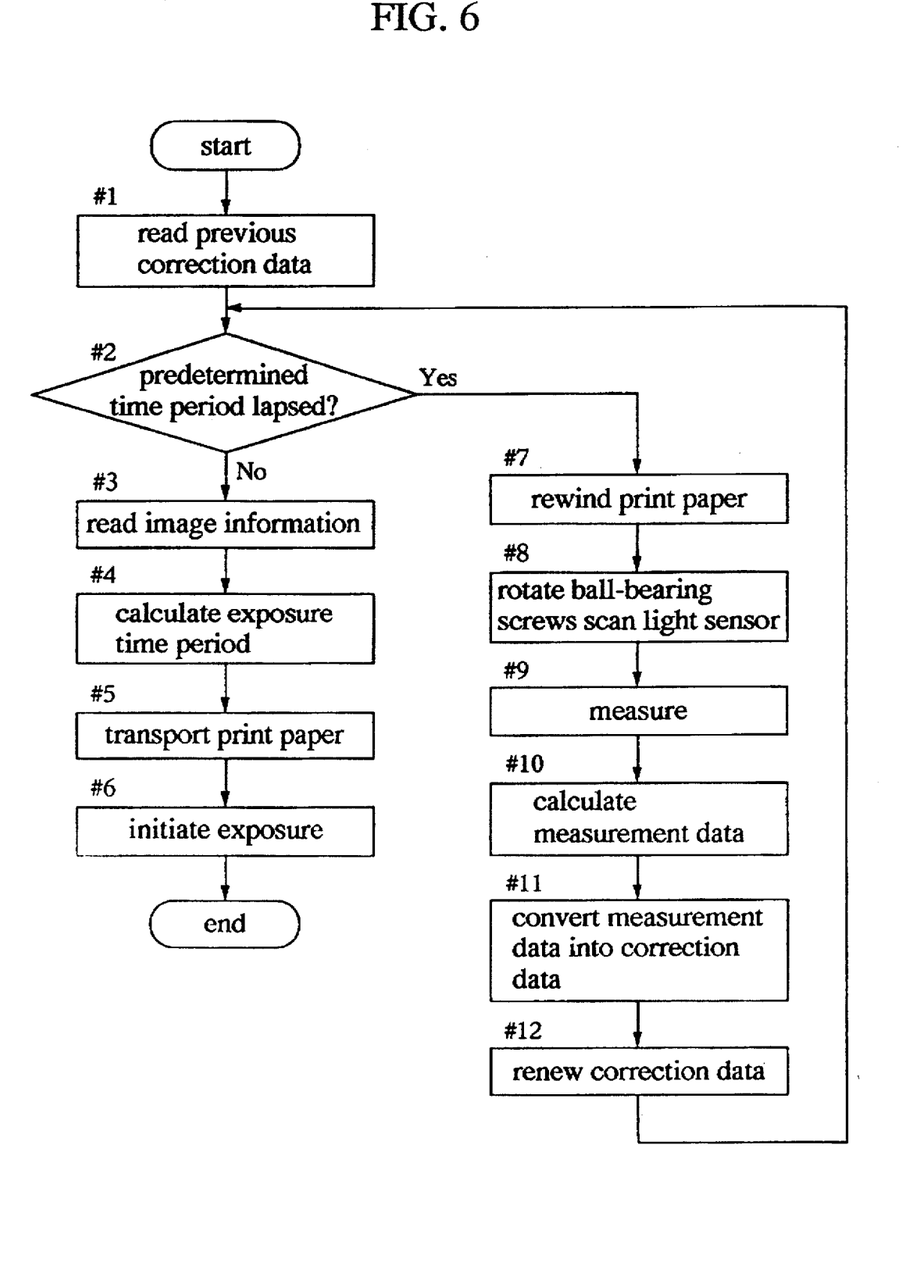
FIG. 6 is a flow chart relating to operations of the image printer of FIG. 1.

Next, of the operations of the image printer 1 having the above-described construction, the process until the exposure by the image exposure means P and the further process of correcting the exposure amount of the printing paper 2 by the image exposure means P will be described with reference to a flow chart of FIG. 6 which illustrates the control scheme executed by the control unit C.

First, through an outer memory O, the process reads correction data which was generated during the previous correction of the image exposure means P (step #1). This correction data was obtained, in a manner to be described later, for each of the light shutters of the PLZT printing head 14 and are expressed as the inverse value of a ratio of a value of irradiation light intensity of each light shutter relative to a reference value.

Next, it is judged whether an added-up time period measured by a timer for adding up the running time period after the previous correction of the image exposure means P has reached a predetermined time period or not (step 2). This timer is incorporated within the control unit C.

In case the added-up time period of the timer has not yet reached the predetermined time period; then, the process branches to step #3 in order to effect an exposure by the image exposure means P.

For the exposure by the image exposure unit I, first, the image information of the film 6 is read by the scanner 5 (step #3). Then, based on the read image information, an exposure time period is calculated (step #4).

This calculation of an exposure time period is effected for each of the divided areas of the image information. And, of this image information, information concerning density of each of the primary colors of each area is converted into an optimum exposure amount. Then, the exposure amount obtained through the conversion is multiplied by the above-described correction data; and, from the exposure amount resulting from the multiplication, an exposure time period is obtained. Incidentally, since the correction does not concern the intensity of the exposing light, the correction of the exposure amount is substantially equivalent to adjustment of the exposure time period.

Each area is set so as to correspond in size to the size of one unit of the light shutters of the PLZT printing head 14.

With completion of the calculation of the exposure time period effected in the above-described manner, the motor M1 is activated to transport the printing paper 2 (step #5). Then, the exposure by the image exposure means P is initiated (step #6).

On the other hand, at step #2, if it is judged that the added-up time period of the timer has reached the predetermined time period, the process branches to step #7 in order to rewind the printing paper 2 which has been transported beyond the exposing position. Incidentally, in case an exposed portion of the printing paper 2 exits on the downstream side of the transport passage of the printing paper 2 relative to the exposing position, the printing paper 2 may be cut by an unillustrated cutter at an upstream position of the transport passage of the printing paper 2 relative to the exposing position; then, the exposed portion of the printing paper 2 will be transported to the developing unit D.

When the printing paper 2 is removed from the exposing position and a condition shown in FIG. 4 is realized, the motor M3 of the measuring unit 3 is activated to scan the light sensor 32 (step #8). Then, the irradiation light intensities of the PLZT printing head 14 are measured in the above-described manners (step #9).

Then, based on the measurement results, the process obtains, as the measurement data, the ratio of the irradiation light intensity relative to the reference value with respect to each light shutter of the PLZT printing head 14. Then, by obtaining the inverse values of the measurement data, the measurement data are converted into correction data (step #11). Thereafter, the pre-existing correction data are renewed by the newly obtained correction data (step #12). That is, the newly obtained correction data are stored in the outer memory O and the added-up time period of the timer is reset.

Accordingly, the control unit C functions as correcting means E for correcting an exposure amount based on measurement data of the measuring means M.

Next, some other embodiments of the invention will be described.

(1) In the foregoing embodiment, the exposure amount is corrected through adjustment of the exposure time period. Alternatively, the exposure amount may be corrected through adjustment of the intensity of the light irradiated from the PLZT printing head 14.

That is to say, by utilizing the fact that the transmission ratio of the light of the PLZT may be varied by varying the voltage to be impressed to the PLZT of the PLZT printing head 14, the correction of the exposure amount is effected through the adjustment of this impressing voltage.

Figure 7:
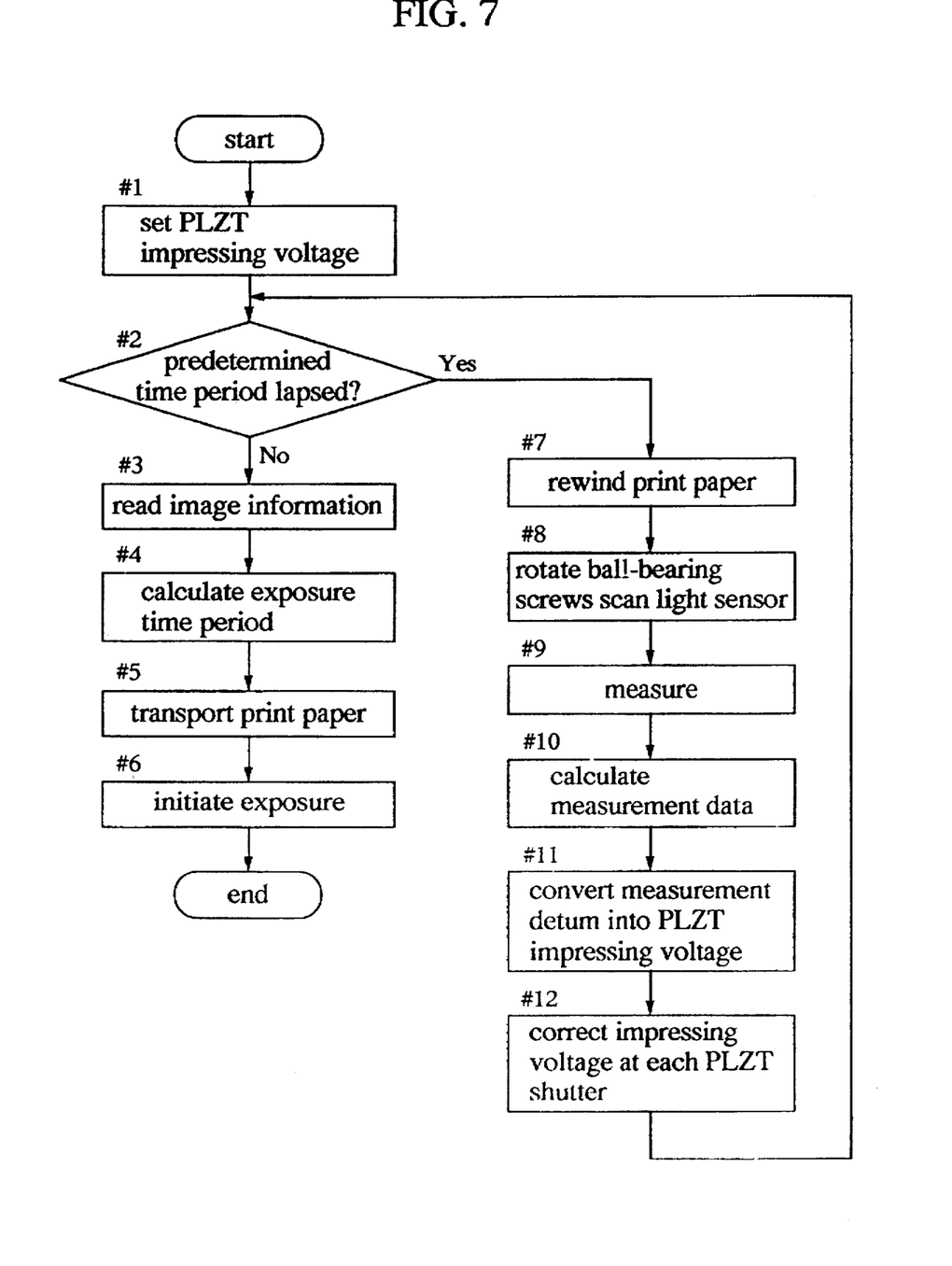
FIG. 7 is a flow chart relating to a further embodiment of the present invention.

The operations of the image printer 1 having the above-described construction will be described next with reference to a flow chart in FIG. 7 corresponding to the flow chart of FIG. 6.

First, the PLZT impressing voltage used in the previous correction of the image exposure means P is read from the outer memory O; then, the impressing voltage is set to the value of this read voltage (step #1).

Next, it is judged whether the added-up time period of the timer which has accumulated the running time period of the image printer 1 since the previously effected correction of the image exposure means P has reached the predetermined time period or not (step #2). This timer is incorporated within the control unit C.

If the added-up time period of the timer has not reached the predetermined time period, the process branches to step #3 to effect an exposure operation by the image exposure means P.

For this exposure operation by the image exposure means P, first, the image information of the film 6 is read by the scanner 5 (step #3). Then, based on this image information, an exposure time period is calculated (step #4).

After the calculation of the exposure time period, the motor M1 is activated to transport the printing paper 2 (step #5). Next, an exposure operation by the image exposure means P is initiated (step #6).

Conversely, if it is judged at step #2 that the added-up time period of the timer has reached the predetermined time period, the process branches to step #7 to rewind the portion of the printing paper 2 which has been transported beyond the exposing position. Incidentally if an exposed portion of the printing paper 2 is present on the downstream side of the transporting passage of the printing paper 2 relative to the exposing position, the printing paper 2 may cut at an upstream position of the transporting passage of the printing paper 2 relative to the exposing position by means of an unillustrated cutter. Then, this exposed portion of the printing paper 2 may be transported to the developing unit D.

After the printing paper 2 is removed from the exposing position to realize the condition as shown in FIG. 4, the motor M3 of the measuring unit 3 is activated to scan the light sensor 32 (step #8). Then, in the above-described manner, the intensity of the irradiation light from the PLZT printing head 14 is measured (step #9).

Based on the result of this measurement, for each of the light shutters of the PLZT printing head 14, a ratio between the measured irradiation light intensity and a reference value is obtained as measurement datum (step #10). Then, this measurement datum is converted into a PLZT impressing voltage (step #11). Then, the impressing voltage of this newly obtained value is impressed to the PLZT of the PLZT printing head 14 (step #12). The newly obtained impressing voltage value is stored at the outer memory O and the added-up time period of the timer is reset.

(2) In the foregoing embodiment, in the measurement of the light irradiated from the PLZT printing head 14 comprised of a number of light shutters, the measurement is effected by using a single light shutter as one measurement unit. Instead, the measurement of the light intensity may be effected with opening a plurality of light shutters at one time, so that the correction may be effected based on this measurement datum.

(3) In the foregoing embodiment, the measurement of the irradiation light intensity of the PLZT printing head 14 is effected through scanning of the light sensor 32. Alternatively, the measurement of the irradiation light intensity may be effected by means of a light sensor comprised of an array of light receiving elements and disposed in opposition to the PLZT printing head 14.

(4) In the foregoing embodiment, the correction of the exposure amount is effected after lapse of each predetermined time period. An alterative arrangement is conceivable as shown in FIG. 5. In this case, a total transportation amount i.e. exposure amount of the printing paper 2 is added up by a rotary encoder 100 disposed coaxially with the rotary shaft of the roller 21, so that correction of the exposure amount is effected when said added-up value reaches a predetermined value.

(5) In the foregoing embodiment, units of PLZT are employed as the light shutters of the image exposure unit I. Instead, liquid crystal shutters may be employed.

(6) In the foregoing embodiment, the irradiation light intensities are measured of all the light shutters of the PLZT printing head 14. Instead, the measurement may be effected of some selected ones of the light shutters, so that the correction of the exposure amount is effected based on this measurement information.

(7) In the foregoing embodiment, the single PlZT printing head 14 is employed for exposing the printing paper 2. An alternative arrangement is conceivable that a single kind of image information may be exposed on to a large printing paper 2 by means of an interconnected assembly of a plurality of printing heads such as PLZT printing heads.

In this case too, measuring means for measuring the irradiation light intensity of the interconnected printing heads may be provided for allowing correction of the exposure amount.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An exposing apparatus for exposing a photosensitive material under transportation, which comprises:
   a printing head including an optical element array having a plurality of optical elements for exposing the photosensitive material;
   measuring means for measuring intensity of light from said printing head, said measuring means including:
     a light sensing unit movable along an extending direction of said optical element array substantially in opposition to said respective optical elements; and
     correcting means for generating correction data based on a reference value of the light intensity of each said optical element of said printing head and a measurement value from said light sensing unit, and correcting an exposure amount based on said correction data; and
   a driver for controlling said each optical element according to said corrected exposure amount.

2. An exposing apparatus as claimed in claim 1, wherein said light detecting unit comprises a single light sensor.

3. An exposing apparatus as claimed in claim 2, wherein said measuring means includes a sensor mount for mounting said single light sensor thereon and a ball bearing screw mechanism for moving said sensor mount along the extending direction of said light element array.

4. An exposing apparatus as claimed in claim 2, wherein said correcting means includes a memory for storing said correction data, which data are rewritten with further correction data newly generated at a predetermined timing.

5. An exposing apparatus as claimed in claim 4, wherein the photosensitive material is disposed to be transportable between said light sensor and said printing head, and the photosensitive material is retracted out of an optical path extending from said printing head to said light sensor when said light sensor effects the measurement of the intensity of the light from said printing head.

* * * * *